US006985953B1

(12) United States Patent
Sandhu et al.

(10) Patent No.: US 6,985,953 B1
(45) Date of Patent: Jan. 10, 2006

(54) SYSTEM AND APPARATUS FOR STORAGE AND TRANSFER OF SECURE DATA ON WEB

(75) Inventors: Ravi Sandhu, Fairfax, VA (US); Joon S. Park, Springfield, VA (US)

(73) Assignee: George Mason University, Fairfax, VA (US)

( * ) Notice: Subject to any disclaimer, the term of this patent is extended or adjusted under 35 U.S.C. 154(b) by 0 days.

(21) Appl. No.: 09/451,090

(22) Filed: Nov. 30, 1999

Related U.S. Application Data

(60) Provisional application No. 60/110,217, filed on Nov. 30, 1998.

(51) Int. Cl.
 *G06F 11/00* (2006.01)
(52) U.S. Cl. ............... 709/229; 709/225; 709/226; 713/201; 713/202
(58) Field of Classification Search ................ 709/203, 709/206, 218, 224, 226, 230, 227, 225, 229; 705/51, 44, 26, 9; 713/201, 151, 202; 379/93.12; 707/10; 345/329
See application file for complete search history.

(56) References Cited

U.S. PATENT DOCUMENTS

| | | | | |
|---|---|---|---|---|
| 5,530,852 A | * | 6/1996 | Meske et al. | 709/206 |
| 5,678,041 A | * | 10/1997 | Baker et al. | 707/9 |
| 5,729,594 A | * | 3/1998 | Klingman | 379/93.12 |
| 5,875,296 A | * | 2/1999 | Shi et al. | 713/202 |
| 5,933,811 A | * | 8/1999 | Angles et al. | 705/14 |
| 5,963,915 A | * | 10/1999 | Kirsch | 705/26 |
| 5,987,440 A | * | 11/1999 | O'Neil et al. | 705/44 |
| 6,049,877 A | * | 4/2000 | White | 713/201 |
| 6,226,752 B1 | * | 5/2001 | Gupta et al. | 713/201 |
| 6,233,577 B1 | * | 5/2001 | Ramasubramani et al. | 709/203 |
| 6,314,521 B1 | * | 11/2001 | Derby | 713/201 |
| 6,341,353 B1 | * | 1/2002 | Herman et al. | 713/201 |
| 6,385,596 B1 | * | 5/2002 | Wiser et al. | 705/51 |
| 6,411,998 B1 | * | 6/2002 | Bryant et al. | 709/224 |
| 6,460,071 B1 | * | 10/2002 | Hoffman | 709/203 |
| 6,510,439 B1 | * | 1/2003 | Rangarajan et al. | 707/201 |
| 6,601,169 B2 | * | 7/2003 | Wallace et al. | 713/151 |
| 6,691,113 B1 | * | 2/2004 | Harrison et al. | 707/10 |

* cited by examiner

*Primary Examiner*—Khanh Dinh
(74) *Attorney, Agent, or Firm*—David G. Grossman; David Yee; Richard M. Lebovitz

(57) ABSTRACT

The present invention relates to methods and systems for creating secure cookies. The methods can be used to create, receive, and transmit secure cookies, confidential cookies, and authentication cookies.

39 Claims, 8 Drawing Sheets

How to use Secure Cookies on the Web

| | Domain | Flag | Path | Cookie_Name | Cookie_Value | Secure | Expiration |
|---|---|---|---|---|---|---|---|
| Cookie 1 | acme.com | TRUE | / | Name | Alice | FALSE | 12/31/99 |
| ... | | | | | | | |
| Cookie n | acme.com | TRUE | / | Role | manager | FALSE | 12/31/99 |

An Example of Cookies on the Web

FIG. 1

| | Domain | Flag | Path | Cookie_Name | Cookie_Value | Secure | Expiration |
|---|---|---|---|---|---|---|---|
| IP_Cookie | acme.com | TRUE | / | IP_Cookie | 129.174.100.88 | FALSE | 12/31/99 |
| Pswd_Cookie | acme.com | TRUE | / | Pswd_Cookie | hashed_password | FALSE | 12/31/99 |
| KT_Cookie | acme.com | TRUE | / | Kerberos_Ticket | {Alice, $K_{c,s}$}$K_s$ | FALSE | 12/31/99 |
| Sign_Cookie | acme.com | TRUE | / | Sign_Cookie | Signature_of_Alice | FALSE | 12/31/99 |

Authentication Cookies

FIG. 2

Kerberos-based Authentication with cookies

A Set of Secure Cookies on the Web

Pswd_Cookie can be replaced with one of other authentication cookies in Figure 2
How to use Secure Cookies on the Web

| | Domain | Flag | Path | Cookie_Name | Cookie_Value | Secure | Expiration |
|---|---|---|---|---|---|---|---|
| Cookie 1 | acme.com | TRUE | / | Name | Alice* | FALSE | 12/31/99 |
| Card_Cookie | acme.com | TRUE | / | Card | number::123456789*& exp_date::Jan.2000* | FALSE | 12/31/99 |
| Coupon_Cookie | acme.com | TRUE | / | Coupon | ID::123&off::10%* | FALSE | 12/25/98 |
| Pswd_Cookie | acme.com | TRUE | / | Pswd_Cookie | hashed_password | FALSE | 12/31/99 |
| Key_Cookie | acme.com | TRUE | / | Key_Cookie | encrypted_key* | FALSE | 12/31/99 |

Sealing Cookies

| | Domain | Flag | Path | Cookie_Name | Cookie_Value | Secure | Expiration |
|---|---|---|---|---|---|---|---|
| Seal_Cookie | acme.com | TRUE | / | Seal_Cookie | Seal_of_Cookies** | FALSE | 12/31/99 |

\* Sensitive fields can be encrypted in the cookies.
\*\* Seal of Cookies can be either MAC or signed message digest of cookies.
Pswd_Cookie can be replaced with one of other authentication cookies in Figure 2

An Example of Secure Cookies for Electronic Transactions

FIG. 6

| | Domain | Flag | Path | Cookie_Name | Cookie_Value | Secure | Expiration |
|---|---|---|---|---|---|---|---|
| Cookie 1 | acme.com | TRUE | / | Name | Alice* | FALSE | 12/31/99 |
| ⋮ | | | | | | | |
| Ticket_Cookie | acme.com | TRUE | / | Ticket | ID::4568&Hours::10* | FALSE | 12/25/98 |
| Pswd_Cookie | acme.com | TRUE | / | Pswd_Cookie | hashed_password | FALSE | 12/31/99 |
| Key_Cookie | acme.com | TRUE | / | Key_Cookie | encrypted_key* | FALSE | 12/31/99 |
| Seal_Cookie | acme.com | TRUE | / | Seal_Cookie | Seal_of_Cookies** | FALSE | 12/31/99 |

Sealing Cookies

\* Sensitive fields can be encrypted in the cookies.
\*\* Seal of Cookies can be either MAC or signed message digest of cookies.
Pswd_Cookie can be replaced with one of other authentication cookies in Figure 2

FIG. 7

An Example of Secure Cookies for Pay-per-Access

A Schematic of RBAC on the Web

SYSTEM AND APPARATUS FOR STORAGE AND TRANSFER OF SECURE DATA ON WEB

This application claims the benefit of U.S. Provisional Application No. 60/110,217, filed Nov. 30, 1998, which is hereby incorporated by reference in its entirety.

BACKGROUND OF THE INVENTION

Electronic commerce and business on the Internet is facilitated in large part by the World-Wide-Web. The Hyper-Text Transport Protocol (HTTP) carries all interactions between Web servers and browsers. Since HTTP is stateless, it does not support continuity for browser-server interaction between successive user visits. Without a concept of session in HTTP, users are strangers to a Web site every time they access a page in a Web server.

Cookies were invented to maintain continuity and state on the Web [KM97, KM98]. Cookies contain strings of text characters encoding relevant information about the user. Cookies are sent to the user's computer (hard disk or RAM) via the browser while the user is visiting a cookie-using Web site. The Web server gets those cookies back and retrieves the user's information from the cookies when the user later returns to the same Web site. The purpose of a cookie is to acquire information and use it in subsequent communications between the server and the browser without asking for the same information again. Often times a server will set a cookie to hold a pointer, such as an identification number, as a user-specific primary key of the information database maintained in the server.

Technically, it is not difficult to make a cookie carry any relevant information. For instance, a merchant Web server could use a cookie which contains the user's name and credit card number. This is convenient for users, since they do not have to read lengthy numbers from their cards and key these in for every transaction. However, it is not safe to store and transmit sensitive information in cookies because cookies are insecure.

DESCRIPTION OF THE DRAWINGS

FIG. 1 is an example of cookies on the Web.
FIG. 2 is an example of authentication cookies.
FIG. 6 is an example of secure cookies for electronic transactions.
FIG. 7 is an example of secure cookies for Pay-per-Access.

DESCRIPTION OF THE INVENTION

Figure 3:
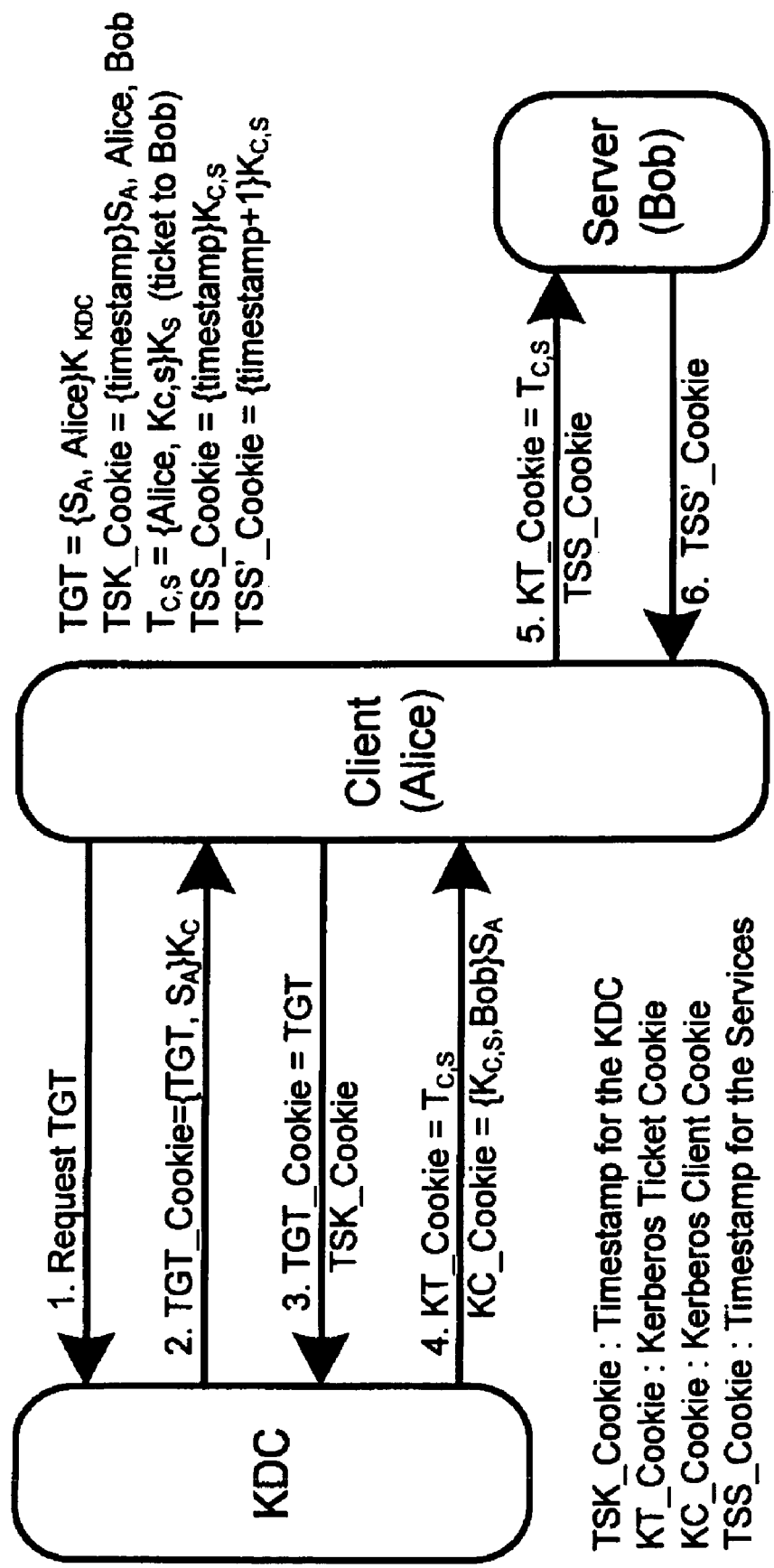
FIG. 3 shows Kerberos-based authentication with cookies.

The present invention relates to methods and devices for making secure "cookies." The present invention relates to all aspects of secure cookies, including methods of creating, receiving, and transmitting secure cookies; methods of creating, receiving, and transmitting confidential cookies; methods of authenticating cookies; methods of providing integrity to cookies; methods of transacting on the Web or Internet using secure cookies; any and all cookies used therein; and any and all devices capable of accomplishing the aforementioned methods. By the term "cookie" or "object" as used herein, it is meant a state object as described in U.S. Pat. No. 5,774,670.

Cookies are stored and transmitted in clear text which is readable and forgeable. A purpose of the present invention is describe methods and techniques to make it secure to carry and store sensitive data in cookies. We show how secure cookies enable secure attribute services between existing Web servers and browsers and identify examples of electronic commerce and business applications for use of this technology. Secure cookies are constructed by using familiar cryptographic techniques, such as message digests, digital signatures, message authentication codes and secret-key encryption. The novelty lies in the manner in which these techniques are applied to implement secure cookies and in the Web services to which secure cookies are applied. A notable aspect is that secure cookies can be issued by one Web server for use by another. This facilitates secure attribute services on the Web by means of secure cookies.

Our techniques have varying degrees of security and convenience for users and system administrators. It is our well-founded belief that there is no such thing as absolute security. Hence, these techniques are not intended to be foolproof but rather to provide a reasonable degree of security. We will consider vulnerabilities of our techniques as we go along. An equally well-founded belief is that a one-size-fits-all approach is rarely effective in systems design. Hence, the need for a variety of techniques for secure cookies providing different tradeoffs between security and convenience for end users system administrators and application developers.

We mention there are other techniques to make Web transactions secure without the use of secure cookies. For example the secure HTTP protocol (s-HTTP) and HTML security extensions [RS98, SR98] can be used for this purpose. Other protocols and extensions could be devised to operate in conjunction with the Secure Sockets Layer (SSL) protocol [WS96], perhaps using public-key certificates. While these possibilities are of considerable interest, our motivation for using the cookie mechanism is that it is already widely deployed in existing Web browsers and servers. The cookie mechanism is in widespread current use for maintaining state on the Web. Hence, it is of interest to see how it could be secured.

The secure cookies mechanisms described in this paper can co-exist with SSL and in some cases actually use SSL for securing some aspect of the overall mechanism. SSL facilitates server-to-client authentication which (for the most part) secure cookies do not address. SSL can also be used to encrypt cookies in transit on the network. We assume the reader is familiar in general outline with SSL and we will rely on it for server-to-client authentication where needed. In a few cases we will use SSL to support secure cookies.

If cookies are to be used to provide the classic security services of integrity, authentication, confidentiality and authorization, we must somehow secure them. As shown herein, this can be done with existing Web servers and browsers.

A preferred embodiment of the present invention relates to a method of creating an http client authentication object, comprising one of more of the following steps in any order: requesting an http file on a http server; retrieving conforming client data; inputting said conforming client data into a http client authentication object; encrypting the client authentication object; transmitting the http client authentication object; and storing the http client authentication object in a storage means on an http client computer means.

The method involves creating an http client authentication object. HTTP is short for HyperText Transfer Protocol and refers to a stateless protocol, or method of transmission, used most commonly in the implementation of the World Wide Web. Although this disclosure is written primarily in terms of HTTP, any language, or means, for transmitting information from one computer to another can be used to implement the present invention. By the term, "client authentication object," it is meant any data structure created by an executable program on the server to be used in the authentication of clients.

In the preferred embodiment of the invention, the process is initiated when an internet or intranet user (e.g., "http client") sends a transmission requesting certain information, e.g., a request for an http file from a http server. The server then uses this transmission to retrieve conforming client relating to that particular client. The conforming data retrieved by the server can come from magnetic media or an optical storage device or the server can initiate a secondary transmission to the client requesting information to be used in future transactions. Any type of conforming client data can be used, including, e.g., IP address, password, etc., which is useful for authentication purposes, i.e., to confirm the client's identity. For example, when assigned statically, the IP address is a 4–12 digit number that will uniquely identify a particular client. This address can be ascertained by the http server in a fairly straightforward manner from the packet header. Another type of client data can be a Kerberos ticket. Kerberos is an authentication standard developed at the Massachusetts Institute of Technology and allows the server to authenticate the source of a transmission by requiring that the client include a pre-created authentication object, or ticket, with each transaction. This ensures that an intermediary source is not attempting to send his own packet and "spoof" it as originating from the client. Other examples are discussed in more detail below.

The server handles the creation of the authentication object in a slightly different manner when the client's password or other sensitive information is among the set of data to be contained in the object. The invention calls for encryption of this data before the cookie is sealed so as to ensure confidentiality in the transmission and also while the data is stored on either the server or the client's storage medium. Types of data which can utilize this extra layer of encryption include social security numbers, credit card numbers, client private encryption keys, hashing keys as well as passwords. Upon receiving the password, the server then encrypts that password using either its private encryption key or a hashing algorithm. It then stores the hashed or encrypted password in its own sub-object to become part of the final authentication object.

Once the server has the data it requires either from disk retrieval or via the secondary transmission to the client, it then can create the final http client authentication object. In preferred embodiments, this object is comprised of a set of sub-objects such as the password object as described above. The server can "seals" the final object by using its private key, for example, one generated by either a MD5 or SHA algorithm. This seal gives the client the capability to ensure that the cookie was not tampered with during transmission, providing the data integrity element of the invention. The server then transmits the sealed authentication object to the client. Upon receipt, the client stores it on some type of storage means for use in later transactions with the server.

2 Cookies

At present, there are many browsers that support cookies including Netscape, MS Internet Explorer, GNNWorks, Net-Cruiser and OmniWeb. There are basically three modes of cookie management in browsers. The first mode is to simply refuse all cookies without asking. The second mode is to accept all cookies and offers users the ability to delete all of them at once. The last provides more options to users. A user can decide to accept cookies from designated sites.

Cookies have been used for many purposes on the Web such as selecting display mode (e.g., frames or text only), shopping cart selections, and carrying names, passwords, account numbers, or some other bits of identifying data on the user's machine. The possible applications are endless since cookies are a general mechanism to save and replay relevant application-dependent data. Contrary to some discussions in the popular press, cookies cannot interact with other data on the user's hard drive, nor can they capture anything from it. They can only save and retrieve information placed therein by Web servers. However, addressing the legitimate security concerns raised by cookies is a non-trivial matter.[3]

2.1 Cookie Specifications

Although there are many ways to use cookies on the Web, the basic process and the contents of cookies are based on the following description. FIG. 1 shows an example of cookies.

To create a cookie for a Web site, the server sends a Set_Cookie header line as follows after a browser requests a URL access to the site:

SET-Cookie: Cookie_Name=Cookie_Value; expire=Date; domain=Domain_Name; path=Path; Secure_Flag=boolean; Flag=boolean Cookie_Name and Cookie_Value have the actual information we want to keep in the cookie. We can have multiple Cookie_Name and Cookie_Value pairs in a cookie which appears as one to the browser.

Date is the valid lifetime of the cookie. By default, the cookie is set to expire when the browser is closed. If the expiration date is set, the cookie will no longer be stored when the expiration date has been reached.

Domain_Name is a host or domain name where the cookie is valid. When a server is looking for the cookies for a particular Web site, a comparison of the Domain_Name is made with the actual Internet domain name of the host. For instance, this field could have domain=acme.com as a domain name.

Flag specifies whether or not all machines within a given domain can access the variable in the cookie. If true all servers in the specified Domain_Name can use the cookie (and the browser will supply the cookie to all servers in that domain). If false Domain_Name is interpreted as a host name, which is the only host to whom the browser will give that cookie.[4]

Path sets the valid path at the domain for the cookie. The most general path is "/".

For instance, the path "/foo" would match "/foodoc" and "/foo/index.html".

If a cookie is specified "secure", the cookie will only be transmitted over secure communications channels such as SSL [WS96] connection.

All of the above fields are optional except Cookie_Name and Cookie_Value. Whenever a browser which has some cookies sends an HTTP request for a URL to a Web sever, the request includes a line of the following form.

Cookie: Cookie_Name1=Cookie_Value1; Cookie_Name2=Cookie_Value2; ...

Only those cookies relevant to that server (by virtue of Domain_Name and Flag fields) will be sent by the browser.

If the server finds any cookies which are applicable for the server, those cookies are used during this communication between the browser and the server. However, if the server does not find any cookies specified for it, either that server does not use cookies in the communication or the server creates new cookies for subsequent communication between the browser and the server. Furthermore, servers may update the contents of their cookies for any specific circumstance. The issuer of the cookies is not important for cookies' validation. In other words, a server can create cookies for other servers in the domain. This is an important aspect of cookies which is used for our applications described in section 4.

2.2 Security Concerns in Cookies

Cookies are often used by Web servers to tag visitors, to identify who they are and what they are up to. For instance, if a merchant Web site has a customer database which contains customers' information such as names, addresses, payment histories, merchandising histories, and credit card numbers, the Web site creates and uses cookies to store pointers to individual customer records in the customer database. It is efficient to store a simple ID number of a customer in a cookie rather than to store all of the customer's information in the cookie. Moreover, this ID number can be exposed in a cookie without exposing the actual customer data.

Cookies are electronic notes for Web servers stored on the browser side. Some people may be concerned that any random site could read the cookies on a user's hard disk, or if cookies could be used to steal information from a user's hard disk. Fortunately, there is no way a cookie can examine the contents of the user's hard drive, nor can it release the user's private data on the Web. Therefore, if cookies do not carry any sensitive information about the user, or the sensitive information is not in plain text, (for instance, if cookies carry encrypted text of sensitive information), we can achieve confidentiality of data transmitted in cookies.

2.3 Security Threats to Cookies

However, what if a malicious user changes the contents of the cookies? What if a malicious user uses cookies of other people, perhaps stolen from their computers? What if a malicious user collects cookies from other people and extract some sensitive information such as credit card numbers or passwords? Actually, these attacks are easy to carry out, since cookies are stored in plain text somewhere on the user's hard disks. A user, say Alice, can change the contents of her cookies, such as ID numbers to a Web site, and access the Web site with the forged cookies. Alice can make a copy of cookies from Bob's machine to her machine, and easily can impersonate Bob in the Web sites that accept Bob's cookies. Furthermore, if Alice can impersonate a site that accepts Bob's cookies, or if she penetrate one such site, Bob's browser sends Alice all the cookies from that domain. Then, Alice can use the harvested cookies for all other sites within the domain. Therefore, cookies are not a right place to store sensitive information, such as, passwords, credit card numbers, purchase authorization numbers, and so on.

We distinguish three types of threats to cookies: network security threats, end-system threats and cookie-harvesting threats. Cookies transmitted in cleartext on the network are susceptible to snooping (for subsequent replay) and to modification by network threats. Network threats can be foiled by use of the Secure Sockets Layer (SSL) protocol [WS96] which is widely deployed in servers and browsers.[5] However, SSL can only secure cookies while they are on the network. Once the cookie is in the browser's end system it resides on the hard disk or memory in cleartext. Such cookies can be trivially altered by users and can be easily copied from one computer to another, with or without connivance of the user on whose machine the cookie was originally stored. We call this the end-system threat. The ability to alter cookies allows users to forge authorization information in cookies and to impersonate other users. The ability to copy cookies makes such forgery and impersonation all the easier. Additionally, if an attacker can harvest cookies by impersonating a site that accepts users' cookies, later he can use the harvested cookies for all other sites which accept those cookies. We call this the cookie-harvesting threat. Now, we will describe how to protect cookies from these threats in the following section.

2.4 Related Technologies

For secure communications on the Web, we may consider using other existing technologies, such as, SSL (Secure Socket Layer [WS96]), which supports a secure channel between the server and the user's machine on the Internet. However, SSL cannot solve the stateless problem of HTTP. Furthermore, even though a user can receive cookies from the server over a secure SSL-protected channel, it does not mean that we can trust the user. For instance, once Alice receives some cookies from the server over a secure channel, she can change the contents of the cookies or give them to other people. Then, Alice or the person who is impersonating Alice can access the server which accepts the cookies over a SSL-secured channel using the forged cookies. However, as we will see in this paper, SSL can be used as a part of our solution to protect information on the Web.

3 Cooking Secure Cookies

Secure cookies provide three types of security services: authentication services, integrity services, and confidentiality services.[6] Authentication services verify the owner of the cookies. Integrity services protect against the threat that the contents of the cookies might be changed by unauthorized modification. Finally, confidentiality services protect against the values of the cookies being revealed to unauthorized entity. In this section, we describe how to transform regular cookies shown in FIG. 1 which have zero security, into secure cookies which give us the the basis for providing security services. We consider authentication, integrity and confidentiality of cookies in turn below.

3.1 User Authentication for Cookies

It is already possible to use cookies on the Web between existing Web servers, and browsers.

However, a malicious user can simply snatch the cookies of other people and impersonate the real owner of the cookies in the server which accepts those cookies. To solve this problem we identify four possible authentication methods for cookies: address-based authentication, password-based authentication, Kerberos-based authentication, and digital-signature-based authentication.[7] FIG. 2 shows the authentication cookies. Note that we will use one of those authentication cookies in FIG. 2 with regular cookies in FIG. 1. The choice of an authentication cookie depends on the situation.

3.1.1 Address-Based Authentication

We use the IP_Cookie which grabs the IP address of user's machine for address-based authentication to protect malicious users from impersonating the original owner of the cookies. Since the IP address is one of the environment variables for a user on the Web[8], it is not difficult for a server to grab the user's IP address and put it into the IP__Cookie by internal procedures such as CGI scripts in the server. Now, whenever Alice tries to access the server which accepts the cookies, the server checks first if Alice's current IP address is same as the one in the IP__Cookie Alice sent to the server. If they are identical, the server believes that Alice is the real owner of those cookies.

It is very convenient for users to use their IP addresses as simple authentication information, since users do not need to enter their authentication information during communication between servers and browsers. However, in some cases, using the user's IP address for authentication is not a good solution. For example, what if Alice's IP address is dynamically assigned to her machine whenever she connects to the Internet? In this case, even though Alice is using the same machine as before, the cookies that Alice received in a previous internet connection are not valid any more once the IP address is changed. Furthermore, if Alice's domain uses a proxy server to reach Bob, an attacker can collect Alice's cookies by the cookie-harvesting and can easily impersonate Alice to Bob through the same proxy server which effectively provides the same IP number to multiple users. In addition, we cannot avoid the IP spoofing problem whenever we use IP addresses for some purposes on the Internet. Therefore, to avoid the above problems in such cases, we need to use one of the rest of the authentication cookies described as follows.

3.1.2 Password-Based Authentication

To support users who use dynamic IP addresses, and avoid IP spoofing, we can use password-based authentication. In other words, if the server grabs Alice's password first and puts the hash of the password into a cookie, call it Pswd__Cookie, servers can authenticate the owner of the cookie. Alice is required to type her password for verification whenever she tries to access other servers which accept those cookies.[9] If the hash of the password she entered is same as the one in her Pswd__Cookie, then the server believes Alice is the real owner of those cookies. Alternatively, servers can use an encrypted password instead of the hash of the password in the Pswd__Cookie to authenticate the owner of cookie (detailed encryption process is described in the following subsection). As a result, no one but Alice can use those cookies on the Web. However, this mechanism requires users to enter their passwords for authentication whenever they connect to the site, while using IP__Cookie is transparent to users.

3.1.3 Kerberos-Based Authentication

We can also use Kerberos [SNS88, Neu94] with cookies for mutual authentication. We assume the reader is familiar in general terms with the Kerberos protocol. An http adaptation of the Kerberos protocol is shown in FIG. 3. Kerberos is a secret-key based authentication service in a network. To use Kerberos with cookies for authentication, the user needs additional browser software to replace the value of the cookie (TGT__Cookie), which is containing a ticket-granting ticket (TGT), and generate authenticators ($\{timestamp\}S_A$, $\{timestamp\}K_{C,S}$) in the TSK__Cookie and the TSS__Cookie respectively. Furthermore, we need modify the Kerberos protocol slightly to make the Kerberos ticket cookie, KT__Cookie, be able to work with other secure cookies, which especially support integrity of cookies.

FIG. 3 shows how Alice logs into Bob through the KDC (Key Distribution Center) with a KT__Cookie. The KDC shares a secret key with each principal in the domain. During the initial login, Alice asks the KDC for a session key, $S_A$, and a ticket-granting ticket (TGT), which is encrypted by the KDC's master key, $K_{K\_DC}$. Then, Alice receives $\{TGT, S_A\}K_C$ (encrypted with Alice's secret key, $K_C$) stored in the TGT__Cookie from the KDC.

Alice decrypts the encrypted $S_A$ and the TGT using her secret key, $K_C$. Then, Alice replaces the value of the TGT__Cookie with the TGT and removes $\{TGT, S_A\}K_C$ from her machine. Practically, it is possible for Alice to create another cookie containing the TGT. However, keeping $\{TGT, S_A\}K_C$ in Alice's machine for a long time is not a good idea from a security point of view once Alice does not need it any more.

When Alice later needs to access a remote server (say Bob), Alice connects to the KDC with the TGT__Cookie, along with the TSK__Cookie, which is generated by Alice's machine to carry an authenticator ($\{timestamp\}S_A$) and the name of the remote server, Bob. The KDC verifies the timestamp and decrypts the TGT to discover $S_A$. Then, the KDC creates both the Kerberos client cookie, KC__Cookie, containing $\{K_{C,S}, Bob\}S_A$ for Alice and the Kerberos ticket cookie, KT__Cookie, containing $T_{C,S}$ (encrypted with Bob's secret key) for Bob. As a result, the KDC sends Alice $\{K_{C,S}, Bob\}S_A$ and $T_{C,S}$ separately.

According to the original Kerberos protocol, the KDC is supposed to encrypt those values all together and send $\{K_{C,S}, T_{C,S}, Bob\}S_A$ to Alice in one cookie. However, this approach gives us a limitation for using the KT__Cookie with other secure cookies. For instance, if we need to use a KT__Cookies with regular cookies in FIG. 1 for authentication, we may also consider about the integrity of the cookies which can be supported by another secure cookie, Seal__Cookie (described in section 3.2). By the original Kerberos protocol, users must change the contents of the cookie or generate another cookie to make a cookie which has the ticket to Bob ($T_{C,S}$). This obviously conflicts with the integrity of the cookies. Therefore, the KDC is required to create two separate cookies (KC__Cookie and KT__Cookie) and send them to Alice.

When Alice connects to Bob, the KT__Cookie and the TSS__Cookie, which is generated by Alice's machine containing an authenticator ($\{timestamp\}K_{C,S}$) are sent by Alice to Bob. To provide mutual authentication, Bob responds to the authenticator. Now, Alice believes that she is connecting to Bob, since Bob was able to decrypt the ticket in the KT__Cookie, which meant he knew $K_{C,S}$ encrypted with $K_S$.

3.1.4 Digital-Signature-Based Authentication

If servers know users' public keys, the digital signature technologies such as DSA [Fed91] and RSA [RSA78] can be used to authenticate users with cookies. To use this method, the user needs additional browser software to generate a cookie which contains a signed timestamp. For instance, when Alice needs to access a remote server (say, Bob), who knows Alice's public key, Alice's machine generates a timestamp and creates the Sign__Cookie shown in FIG. 2, which has Alice's digital signature (signed with her private key) on the timestamp. When Alice connects to Bob, he receives the Sign__Cookie from Alice and verifies the signature with her public key.[10]

3.2 Providing Integrity to Cookies

Figure 4:
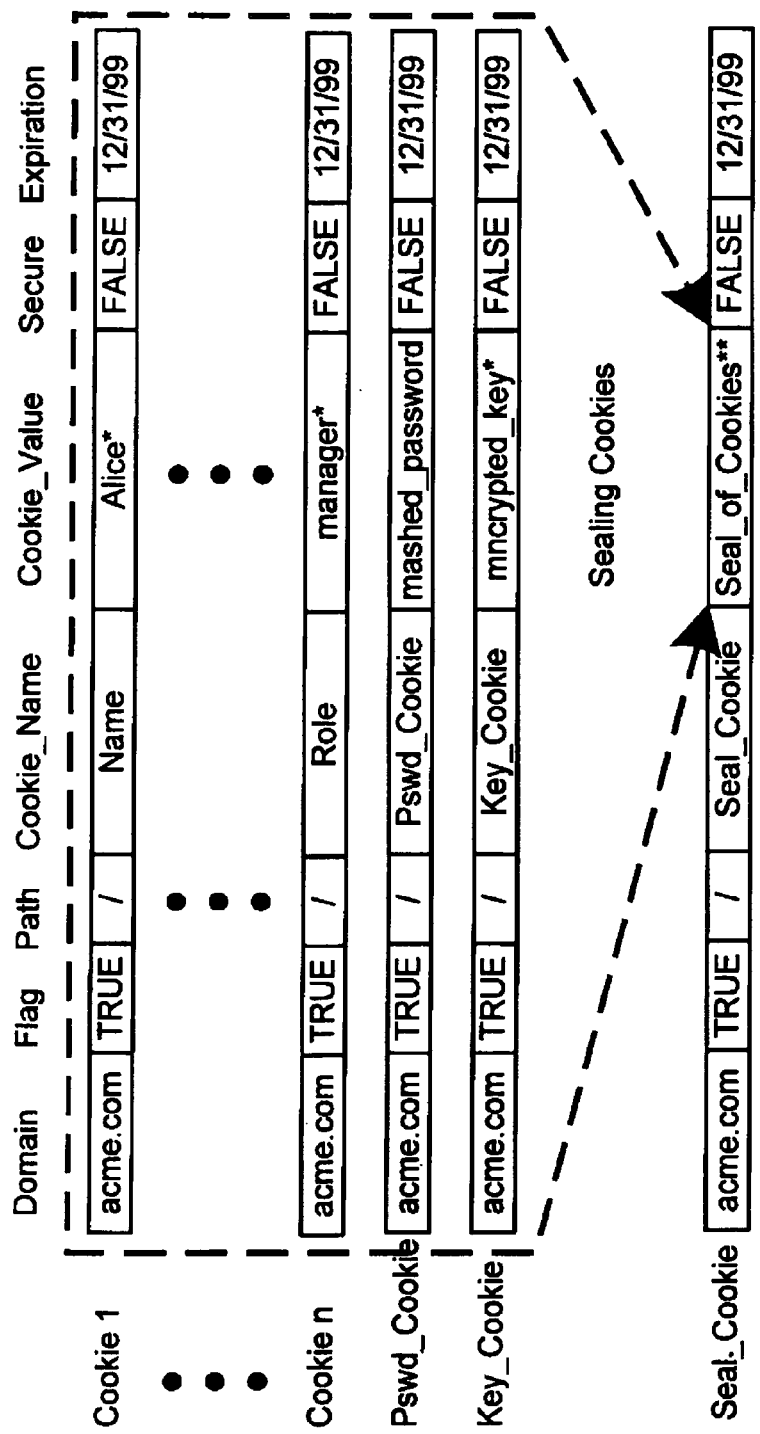
FIG. 4 shows a set of secure cookies on the Web.
Figure 5:
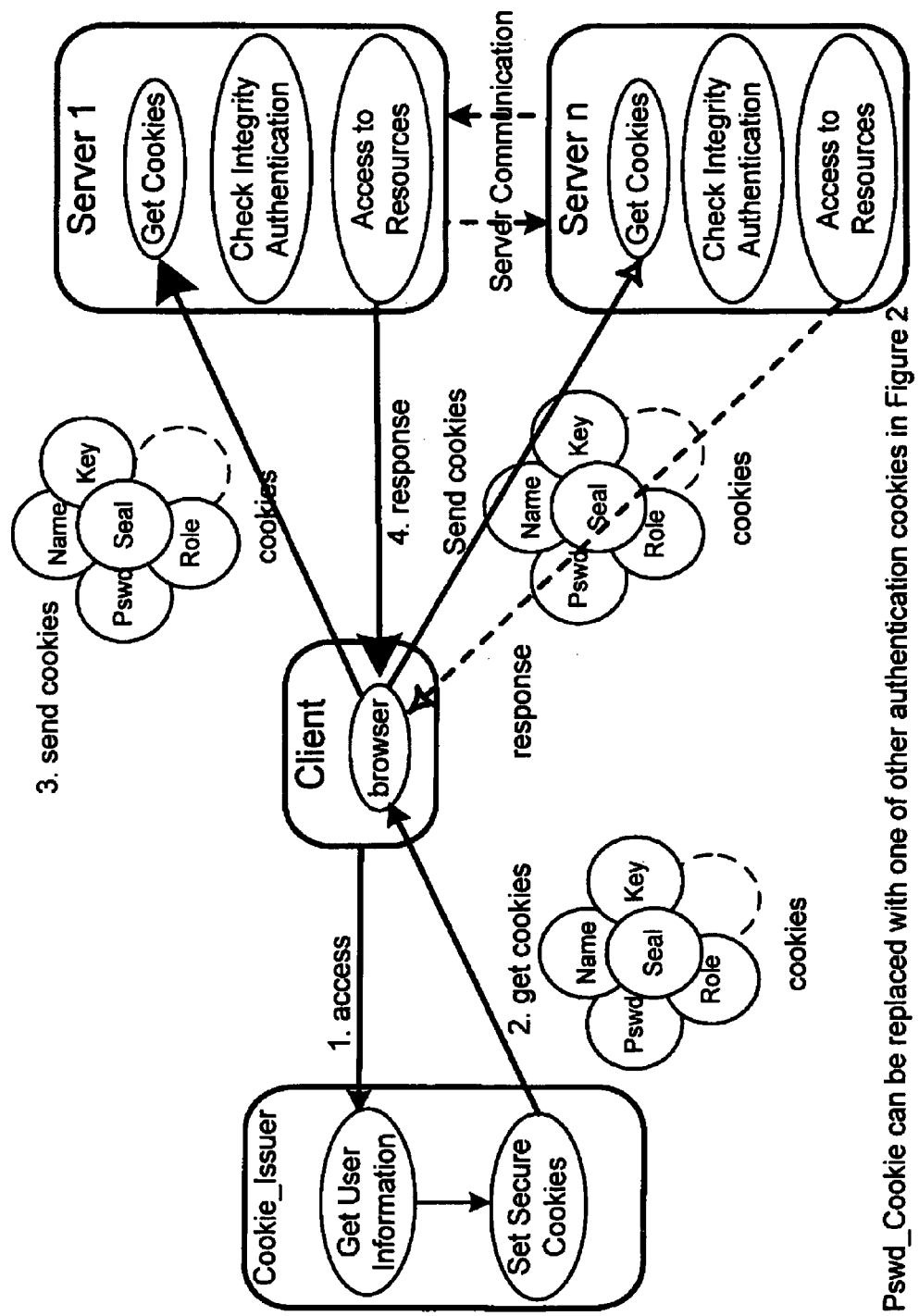
FIG. 5 is an illustration of how to use secure cookies on the Web.

There are also integrity problems with cookies. For instance, if an attacker wants to impersonate Alice who uses the IP__Cookie, he can copy the IP__Cookie from Alice and edit it with his IP number, then impersonate Alice in the domain which accepts the IP__Cookie. FIG. 4 shows a set of secure cookies and FIG. 5 shows how the secure cookies are used with regular cookies on the Web. The regular cookies and the authentication cookie have the same purposes as we described in the previous subsection. The Seal_Cookie is being used to determine if the contents of the cookies have been altered. The contents of the Seal_Cookie depends on the cryptographic algorithm used for the cookie. The key distribution between servers can be achieved by key agreement algorithms such as RSA [RSA78] or Diffie-Hellman [DH97].

3.2.1 Public-Key-Based Solution

In the case of using public-key technology, the server creates a message digest from the rest of the cookies using a message digest algorithm such as MD5 [Riv92] or SHA [Fed95], signs it using the server's private key and puts the signature in the Seal_Cookie.

When the user returns to the same domain by accessing one of servers in the domain with the set of secure cookies, the server gets all cookies for the site from the user. Any server in the domain can verify the signature in the Seal_Cookie using the public key of the cookie-issuing server. If the integrity verification is successful, then there has been no alteration in the cookies. If the cookies are valid, the server allows the user to execute transactions based on the values denoted in the cookies.

In some cases, if we do not need the confidentiality of information in cookies, for example, when we use cookies without sensitive information, we do not need encryption mechanism. Specifically, we do not need the Key_Cookie (described in section 3.3). Furthermore, servers do not need to have a shared pair of public-key and private-key. However, in this case, only the server which has the private key in the domain can update the contents of the cookies for any specific circumstance. For instance, when we need to update the contents of the cookies, the user has to go back to the server which has the private key to renew them unless servers have a shared pair of public-key and private key, because the updated cookies need the digital signature by the server's private key.

3.2.2 Secret-Key-Based Solution

In the case of using the secret-key cryptography, the server creates an integrity-check value from the rest of the cookies by using key-dependent one-way hash function such as HMAC [BCK96], and puts it in the Seal_Cookie. When a user returns to the same domain by accessing one of the servers in the domain, the server obtains all cookies for the site from the user. Assuming that each server in the domain has a secret key shared with other servers, the server creates a keyed-hash value from the cookies except the Seal_Cookie and compare it with the one in the user's Seal_Cookie. If both of the values are identical, the server believes that there has been no alteration in the cookies.

Furthermore, if we use the secret-key based solution for secure cookies, any server which has the shared secret key in the same domain can update the contents of the cookies for any specific circumstance. For instance, if a server needs to extend the expiration date of the cookies, the user does not have to go back to the server which created the cookies to renew them.

3.3 Providing Confidentiality to Cookies

Finally let us consider how to protect other people, or perhaps even the cookie owner, from reading sensitive information in the cookies. To do so, sensitive information, such as, names, roles and credit card numbers can be encrypted by the server and stored in cookies. We use the Key_Cookie shown in FIG. 4 to store an encrypted session key, which was used to encrypt sensitive information of other cookies. The session key can be encrypted either by the server's public key or by the server's secret key which is shared with other servers in the domain. We may encrypt the contents of the cookies with the server's secret key or public key directly (we do not need the Key_Cookie in this case). However, for more secure services, we recommend using a session key for confidentiality services with cookies. In the case of using the public-key cryptography for encryption, we recommend using separate public-key pairs for encryption and for digital signature since servers can share the private key for information decryption while keep the private key for digital signature secret.

When a server receives secure cookies including the Key_Cookie, the server decrypts the value of the Key_Cookie by using it's master key (private key or secret key) which can be shared with other servers, and gets the session key which was used to encrypt sensitive information in other cookies. Then, the server decrypts and reads the encrypted information in the cookies using the session key. If the contents of the cookies were encrypted by the server's secret key or public key (Key_Cookie is not required), the server decrypts the encrypted information in the cookies using the corresponding key directly. After the server checks the validity of all the cookies, it allows the user to execute transactions based on the values denoted in the cookies.

3.4 Discussion

SSL can be used to provide one possible alternative to make systems more secure and efficient. Suppose we have hundreds of servers in an organization which needs integrity, authentication and confidentiality services in cookies. It is not a good idea to make individual

TABLE 1

Summary of the Recipes for Secure Cookies

| Effect | Auth | | | | | Auth + | |
|---|---|---|---|---|---|---|---|
| | SSL | IP | Pswd* | KT, Sign | Seal | Auth + Seal | Key + Seal |
| Network Threats | O | X | X | X | X | O | O |
| End System Threats | X | X | X | X | X | O | O |
| Cookie-Harvesting Threats | O | X† | O | O | X | DA | DA |
| Information Hiding | No | No | No | No | No | No | Yes |
| Additional Client Software | NR | NR | NR | R | NR | DA | DA |
| IP Spoofing | O‡ | X | NO | NO | | DA | DA |

O: can solve the problem, X: cannot solve the problem, R: required, NR: not required, DA: depends on the authentication cookie
*Password protected by SSL during verification.
†IP_Cookie cannot solve the cookie-harvesting threats when users use a proxy server.
‡SSL can protect the IP spoofing problem by requiring client-to-server authentication.

servers share a secret key with other servers in the domain since this increases exposure of the secret key. To support more secure service, several verification servers can be used which have the secret key shared with other verification servers to verify, decrypt or update cookies issued by cookie-issuing servers in the domain. Now, the remaining servers do not need to have the shared secret key. When a cookie-using server receives a set of secure cookies from a user, the cookie-using server asks one of those verification servers if the cookies are valid. Then, the verification server verifies the cookies and sends the result to the cookie-using server in plain text over the secure channel achieved by SSL. Furthermore, if it is necessary, the verification server can update some information in the cookies. Finally, the server allows the user to execute transactions in the server based on the information received from the verification server.

3.5 Comparison of the Recipes and Effects of Secure Cookies

A summary of the recipes for secure cookies on the Web is shown in table 1. Regular cookies are susceptible to the network threats, the end-system threats, and cookie-harvesting threats (see section 1). Actually, there is no security in regular cookies. Since SSL provides server-to-client authentication (optionally mutual authentication is possible by requiring client-to-server authentication) and data encryption on the Web, SSL can protect cookies from the network threats, IP spoofing, and cookie-harvesting threats. However, it cannot protect cookies from the end-system threats. One of the authentication cookies (IP_Cookie, Pswd_Cookie, KT_Cookie, or Sign_Cookie) and Seal_Cookie can be used to provide authentication and integrity services to cookies respectively. If authentication is dependent on IP addresses, IP spoofing remains a threat. Furthermore, IP_Cookie cannot protect cookies from the cookie-harvesting threats if users use a proxy server. On the contrary, if servers use the Pswd_Cookie (carrying the hash of user's password), the KT_Cookie (carrying the Kerberos ticket), or the Sign_Cookie (carrying user's digital signature), authentication has neither IP spoofing exposure nor cookie-harvesting threats. However, using Pswd_Cookie requires users to enter their authentication information for each server in the domain and requires SSL to protect the password on the network and to achieve server-client authentication (so as to prevent server spoofing). Use of the IP_Cookie is transparent to users. Using KT_Cookie supports mutual authentication between clients and servers. However, using either the KT_Cookie or the Sign_Cookie requires additional browser software to deal with ticket-granting tickets and authenticators. Additionally, if cookies have some sensitive information which are needed to be encrypted by a session key, Key_Cookies can be used with other secure cookies to store the encrypted session key as shown in the table.

4 Applications of Secure Cookies

In this section, we introduce some applications of secure cookies. This is a representative sample and many other applications can be imagined.

4.1 User Authentication

Web servers can use secure cookies to authenticate their visitors. Detailed procedures how to make and use those cookies are described in section 3.1.

Address-based authentication is very convenient since it can be processed without users' cooperation, such as, entering authentication information, assuming that the identity of the owner of the cookies can be inferred based on the IP address from which cookies arrive. However, it cannot support users who use dynamic IP addresses, and has IP spoofing exposure. Furthermore, in the case that users use a proxy server, address-based authentication is susceptible to the cookie-harvesting threats.

Password-based authentication can solve the above problems but requires user intervention to enter a password on each authenticated connection. From a user's point of view, this procedure is not different from the one in conventional method. In other words, a user must enter his or her authentication information whenever the user connects to the site. However, if servers use the secure cookies for user authentication, they do not need user authentication databases, which cause a single point attack, since each user's information is distributed to user's cookies and stored in his or her hard drive securely.

Kerberos can be used with cookies to support mutual authentication between servers and clients as we described in the previous section. However, to use Kerberos with cookies, the user needs additional browser software to replace the value of the cookie containing a ticket-granting ticket (TGT), TGT_Cookie, and deals with authenticators ($\{timestamp\}S_A$, $\{timestamp\}K_{C,S}$). Furthermore, to make it possible for the KT_Cookie to work with other secure cookies such as Seal_Cookie, the KDC is required to create two separate cookies (KC-Cookie and KT_Cookie) and send them to the client.

If servers know users' public keys, the digital signature technology can be used for authentication services with cookies. However, the user needs additional browser software to generate the cookie containing a signed timestamp which is acceptable to the server.

4.2 Electronic Transactions

Because of the regular cookies' insecurity, a merchant site usually sets a cookie to hold just a pointer such as an ID number which is a key field of the customer-information database in the site. However, this implies that a customer-information database must be maintained on a server. One of the disadvantages of this method is that if the server keeping customers' information is penetrated by an attacker, all the customers' information, such as credit card numbers, preferences, addresses and other sensitive information in the server are open to the attacker. Furthermore, if a domain has multiple servers with multiple customer-information databases, maintenance and synchronization of this information is burdensome. There are also significant privacy concerns about data stored by servers, since such data can easily be misused. Users may feel more comfortable with servers that pledge not to maintain such data.

Secure cookies can solve these problems especially in the electronic commerce field. If a merchant site creates and uses the set of secure cookies shown in FIG. 6, the site does not need to have a customer-information database unless the site needs to track customers' access histories since each customer's sensitive information is distributed and stored securely in the customer's hard disk. The secure cookies provide a more secure environment by eliminating customer-information databases which can cause a single point failure. Furthermore, the merchant can reduce the cost for the maintenance of customer-information databases.

The Card_Cookie has multiple pairs of Cookie_Name and Cookie_Value in its Cookie_Value as described in section 2. Intuitively, a merchant site should set the Card_Cookie to expire before the actual expiration date of the credit card. For more convenient services, the merchant can issue special tokens for customers such as electronic coupons which contains coupon's ID number and discount information. For instance, if Alice received an electronic coupon along with other secure cookies, she can use it before the coupon's expiration date in the merchant site. In this case, the merchant site needs to keep a record for the coupon to protect replay usages of the same coupon.

4.3 Pay-per-Access

Today, many pay-per-access sites provide various information services such as performances, games, movies, and other special events in the Web environment. Therefore, it is obvious that we need secure mechanisms to sell/buy and use tickets to such sites on the Web.

Secure cookies can be used to solve this problem. Suppose Alice wants to buy an access to a pay-per-access site. After Alice pays for the access to the site, the server has to give her a token which allows Alice to access the site until the ticket expires. If Alice receives a cookie, let's call it Ticket_Cookie, which contains her access limit, along with other secure cookies, she can access the site as long as the Ticket_Cookie is valid. No one but Alice can use her secure cookies. FIG. 7 shows an example of a set of secure cookies for Pay-per-Access sites on the Web.

The access limit in the Ticket_Cookie is controlled either by time or by the number of connections. For instance, if a merchant site issues a 10 hour (or 10-time) ticket to Alice, the site allows Alice to use its resources up to 10 hours (or 10 times) until her Ticket_Cookie expires.

A merchant site could control a customer's access limit by simply updating the content of the Ticket_Cookie with customer's residual access limit (hours or the number of times). However, this is not a good idea since a smart and malicious customer can access the site more than his or her access limit. For instance, if Alice uses a copy of a whole set of her initial secure cookies including the Ticket_Cookie, then she can have unlimited access to the site until the cookies expire because the merchant site has no idea about customers' replays.

Therefore, to protect malicious customers from replay attack, a merchant site needs to keep information about tickets such as accumulated usage of each ticket at least until the Ticket_Cookie expires. This does not mean that the merchant site needs to keep all the customer information. In other words, only the ticket ID and its accumulated usage are required to be tracked by the merchant site. In this case, merchant sites do not need to update the contents of the cookies. For instance, if Alice's accumulated access usage becomes more than the access limit denoted in her Ticket_Cookie, then the merchant site rejects Alice's request.

4.4 Role-Based Access Control on the Web

Role-Based Access Control (RBAC) is a promising alternative to traditional discretionary and mandatory access controls, which ensures that only authorized users are given access to certain data or resources. It also supports three well-known security policies: data abstraction, least-privilege assignment, and separation of duties [FCK95, SCFY96].

A role is a semantic construct forming the basis of access control policy. With RBAC, system administrators can create roles, grant permissions to those roles, and then assign users to the roles on the basis of their specific job responsibilities and policy. Therefore, role-permission relationships can be predefined, which makes it simple to assign users to the predefined roles. Without RBAC, it is difficult to determine what permissions have been authorized for what users.

Figure 8:
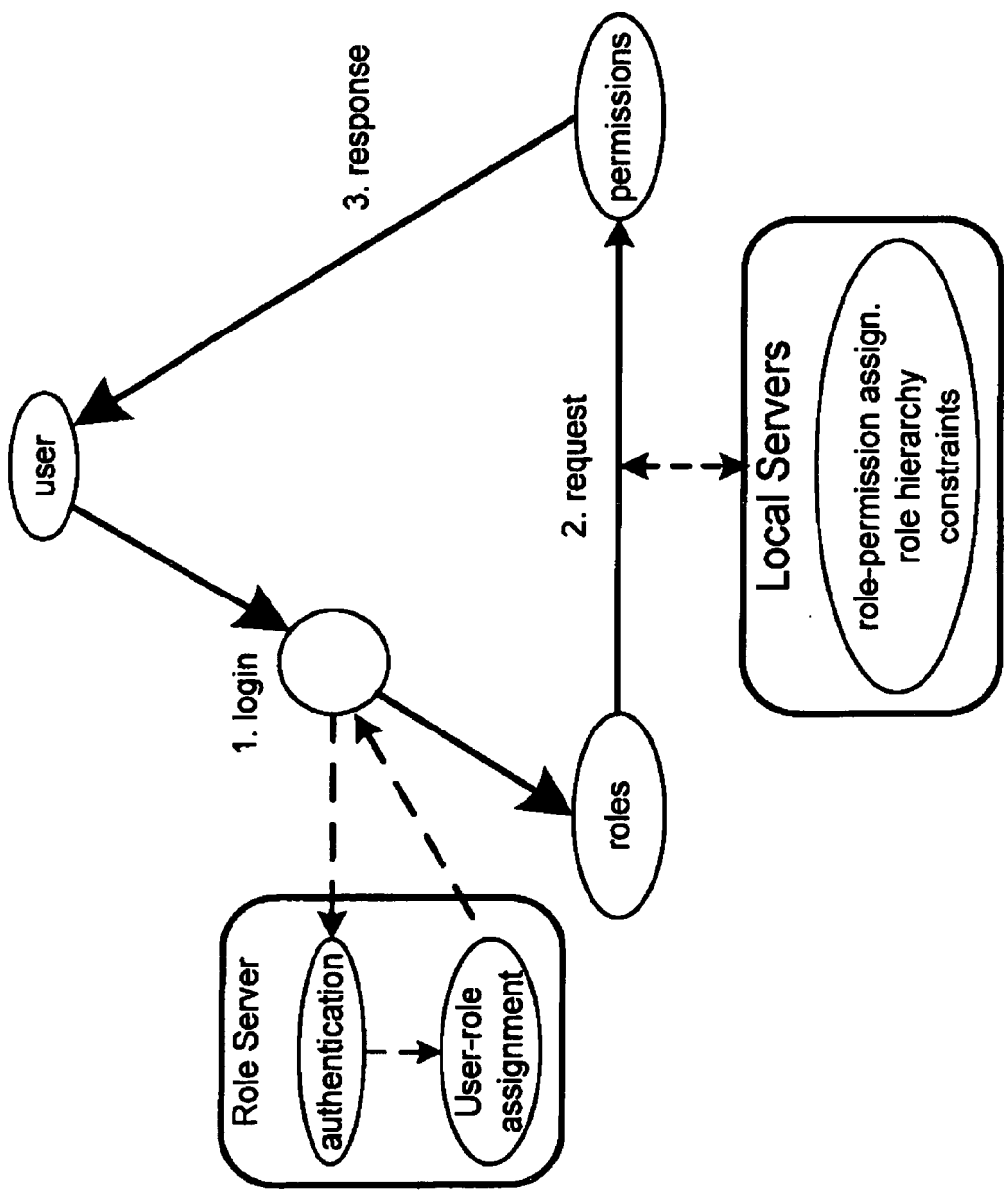
FIG. 8 is a schematic of RBAC on the Web.

FIG. 8 shows a schematic of RBAC on the Web. If a user, let's say Alice, wants to execute transactions in local servers, she needs access to the role server first in the beginning of the session. After the role server authenticates Alice, it finds Alice's explicitly assigned roles and sets role cookies. Subsequently, it creates an authentication cookie (IP_Cookie, Pswd_Cookie, KT_Cookie, or Sign_Cookie), Key_Cookie, and Seal_Cookie to make the cookies secure as shown in FIG. 4. As a result, those secure cookies are stored securely in Alice's hard drive so that Alice does not need to go back to the role server to get her assigned roles until the cookies expire. Technically, we can make any local servers belong to the same domain regardless of their physical location by DNS (Domain Name Service) configuration.

When a local server receives a request from Alice, it gets all the related cookies, in other words, a set of secure cookies for that domain, from Alice's browser and verifies the contents of the cookies first. If all the cookies are valid, the local server allows Alice to execute transactions in the server based on her assigned roles.

REFERENCES

[BCK96] Mihir Bellare, Ran Canetti, and Hugo Krawczyk. Keying hashing functions for message authentication. In *Advances in Cryptography—CRYPTO'90 Proceedings*, volume 1109, Springer-Verlag, 1996. Lecture Notes in Computer Science.

[DH97] Whitfield Diffie and Martin Hellman. *ANSI X9.42: Establishment of Symmetric Algorithm Keys Using Diffie-Hellman*, 1997. American National Standards Institute.

[FCK95] David Ferraiolo, Janet Cugini, and Richard Kuhn. Role-based access control (RBAC): Features and motivations. In *Proceedings of 11th Annual Computer Security Application Conference*, pages 241–48, New Orleans, La., December 11–15 1995.

[Fed91] Federal Register. *Proposed Federal Information Processing Standard for Digital Signature Standard (DSS)*, August 1991. n.169.

[Fed95] Federal Information Processing Standard (FIPS). *Secure Hash Standard*, 1995. FIPS 180–1.

[KM97] David M. Kristol and Lou Montulli. *HTTP state management mechanism*, February 1997. RFC 2109.

[KM98] David M. Kristol and Lou Montulli. *HTTP state management mechanism*, February 1998. draft-ietf-http-state-man-mec-08.txt.

[Neu94] B. Clifford Neuman. Using Kerberos for authentication on computer networks. *IEEE Communications*, 32(9), 1994.

[Riv92] R. L. Rivest. *The MD5 message digest algorithm*, April 1992. RFC 1321.

[RS98] E. Rescorla and A. Schiffman. *Security Eztensions For HTML*, June 1998. draft-ietf-wts-shtml-05.txt.

[RSA78] R. L. Rivest, A. Shamir, and L. Adleman. A method for obtaining digital signatures and public-key cryptosystems. *Communications of the ACM*, 21(2):120–126, 1978.

[SCFY96] Ravi S. Sandhu, Edward J. Coyne, Hal L. Feinstein, and Charles E. Youman. Role-based access control models. *IEEE Computer*, 29(2):38–47, February 1996.

[SNS88] J. F. Steiner, C. Neuman, and J. I. Schiller. Kerberos: An authentication service for open network systems. In *Proc. Winter USENIX Conference*, 1988.

[SR98] A. Schiffman and E. Rescorla. *The Secure HyperText Transfer Protocol*, June 1998. draft-ietf-wts-shttp-06.txt.

[WS96] D. Wagner and B. Schneier. Analysis of the SSL 3.0 protocol. In *Proceedings of the Second UNIX Workshop on Electronic Commerce*, November 1996.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosure of all patents and publications, cited above and in the figures are hereby incorporated in their entirety by reference, including "RBAC on the Web by Secure Cookies," which is attached as Appendix.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A system for transferring secure data on a network comprising:
    a) a client capable of presenting conforming client data;
    b) a server capable of using said conforming client data to create at least two secure cookies, each of said at least two secure cookies including:
        i) a domain field capable of holding domain data to associate said secure cookie to a domain where said secure cookie is valid;
        ii) at least one name field capable of holding name data;
        iii) at least one value field capable of holding value data derived from said conforming client data; and
        iv) an expiration field capable of holding cookie expiration data;
    c) a network capable of transporting at least one of said at least two secure cookies between said server and said client;
    d) a client storage means capable of storing at least one of said at least two secure cookies; and
    e) a secure attribute service between said client and said server using said at least one of said at least two secure cookies,
wherein:
    i) at least one of said at least two secure cookies is a key cookie containing an encrypted session key, said session key capable of encrypting said value data contained in another of said at least two secure cookies; and
    ii) said secure attribute service includes said server being configured to authenticate said client by comparing said conforming client data with said value data.

2. A system according to claim 1, wherein said client is a web browser.

3. A system according to claim 1, wherein at least one of said at least two secure cookies is an authentication cookie.

4. A system according to claim 3, wherein said authentication cookie is an IP cookie and said conforming client data includes the IP address of said client.

5. A system according to claim 3, wherein said authentication cookie is a password cookie and said conforming client data includes a password.

6. A system according to claim 5, wherein said password is processed using a hashing algorithm.

7. A system according to claim 5, wherein said password is processed using an encryption algorithm.

8. A system according to claim 3, wherein said authentication cookie is a sign cookie and said conforming client data includes a digital signature on a timestamp.

9. A system according to claim 3, further including a secret-key based authentication service.

10. A system according to claim 9, and wherein said authentication cookie is a KT cookie and said conforming client data includes a Kerberos ticket created using a Kerberos protocol.

11. A system according to claim 1, wherein at least one of said at least two secure cookies includes a multitude of secure cookies.

12. A system according to claim 1, wherein at least one of said at least one name field and at least one of said at least one value field are a pair.

13. A system according to claim 1, wherein at least one of said at least two secure cookies further includes a flag, said flag specifying whether all machines within said domain referenced by said domain data can access said value data.

14. A system according to claim 1, wherein at least one of said at least two secure cookies is used in an electronic transaction.

15. A system according to claim 1, wherein said system is part of a role based access control system and at least one of said at least two secure cookies is used in assigning client roles.

16. A method according to claim 15, wherein at least one of said at least two secure cookies is an authentication cookie.

17. A method for transferring secure data on a network including the steps of:
    a) a client making a request from a server;
    b) said server retrieving conforming client data;
    c) said server creating at least two secure cookies, each of said at least two secure cookies including selected conforming client data, said selected conforming data including at least some of said conforming client data;
    d) said server transmitting at least one of said at least two secure cookies to said client;
    e) said client storing at least one of said at least two secure cookies;
    f) said client presenting to a related server at least one of said stored at least two secure cookies with a second request, said related server residing on the same domain as said server;
    g) said related server making a determination of whether at least one of said at least one retrieved stored at least two secure cookies contains said selected conforming client data; and
    h) said related server fulfilling said second request if said determination is positive;
wherein at least one of said at least two secure cookies is a key cookie containing an encrypted session key, said session key capable of encrypting said value data contained in another of said at least two secure cookies.

18. A method of claim 17 wherein at least some of said conforming client data is retrieved from said client.

19. A method of claim 17, wherein said conforming client data includes a client's IP address.

20. A method of claim 17, wherein said conforming client data includes a password.

21. A method of claim 17, wherein said conforming client data includes a Kerberos ticket.

22. A method of claim 17, wherein said conforming client data includes a digital signature.

23. A method of claim 22, wherein said determination further includes verifying that said digital signature belongs to said client.

24. A method of claim 17, further including the step of said server encrypting at least some of said selected conforming client data.

25. A method of claim 24, wherein said encrypting uses a public key.

26. A method of claim 24, wherein said encrypting uses a secret key.

27. A method according to claim 8, wherein at least one of said at least two secure cookies is an authentication cookie.

28. A method of claim 24, further including the step of said server decrypting said encrypted selected conforming client data using a secret key.

29. A method of claim 17, further including the step of said server hashing at least some of said conforming client data.

30. A method of claim 17, wherein said conforming client data includes data derived from at least one item from the group consisting of:
- a) the client's IP address;
- b) a password;
- c) a Kerberos ticket;
- d) credit card data;
- e) social security number;
- f) a digital signature of the client; and
- g) a home address.

31. A method of claim 17, wherein said determination is positive only if said selected conforming client data was retrieved by said server from said client during the current session.

32. A method of claim 17, wherein said secure cookie contains a digital signature of said client on a time-stamp.

33. A method of claim 17, further including the step of providing integrity to at least one of said at least two secure cookies comprising:
- a) said server creating integrity data from at least one of said at least two secure cookies, said integrity data including at least one item selected from the group:
  - i) encrypted said selected conforming client data;
  - ii) a digital signature; and
  - iii) a message digest;
- b) said server inputting said integrity data into a seal cookie; and
- c) said server storing said seal cookie.

34. A method of claim 17, wherein said request is part of an electronic transaction.

35. A method of claim 17, wherein said request is part of an attribute-based access control function.

36. A system for transferring secure data on a network comprising:
- a) a client capable of presenting conforming client data;
- b) a server capable of using said conforming client data to create at least two secure cookies, each of said at least two secure cookies including:
  - i) a domain field capable of holding domain data to associate said secure cookie to a domain where said secure cookie is valid;
  - ii) at least one name field capable of holding name data;
  - iii) at least one value field capable of holding value data derived from said conforming client data; and
  - iv) an expiration field capable of holding cookie expiration data;
- c) a network capable of transporting at least one of said at least two secure cookies between said server and said client;
- d) a client storage means capable of storing at least one of said at least two secure cookies; and
- e) a secure attribute service between said client and said server using said at least one of said at least two secure cookies, said secure attribute service includes said server being configured to authenticate said client by comparing said conforming client data with said value data; and wherein at least one of said at least two secure cookies is one of the following:
- i) a seal cookie, capable of being used by said server to determine if at least one of another of said at least two secure cookies has been altered; and
- ii) a key cookie containing an encrypted session key, said session key capable of encrypting said value data contained in another of said at least two secure cookies.

37. A system according to claim 36, wherein said seal cookie includes an integrity check value.

38. A system according to claim 36, wherein said seal cookie includes the signature of a message digest signed using a private key.

39. A method for transferring secure data on a network including the steps of:
- a) a client making a request from a server;
- b) said server retrieving conforming client data;
- c) said server creating at least two secure cookies, each of said at least two secure cookies including selected conforming client data, said selected conforming data including at least some of said conforming client data;
- d) said server transmitting at least one of said at least two secure cookies to said client;
- e) said client storing at least one of said at least two secure cookies;
- f) said client presenting to a related server at least one of said stored at least two secure cookies with a second request, said related server residing on the same domain as said server;
- g) said related server making a determination of whether at least one of said at least one retrieved stored at least two secure cookies contains said selected conforming client data; and
- h) said related server fulfilling said second request if said determination is positive;

wherein at least one of said at least two secure cookies is one of the following:
- i) a seal cookie, capable of being used by said server to determine if at least one of another of said at least two secure cookies has been altered; and
- ii) a key cookie containing an encrypted session key, said session key capable of encrypting said value data contained in another of said at least two secure cookies.

* * * * *